(12) United States Patent
Eitelhuber

(10) Patent No.: US 10,293,381 B2
(45) Date of Patent: May 21, 2019

(54) SYSTEM AND METHOD FOR CONVEYING AN ASSEMBLY

(71) Applicant: KING ABDULLAH UNIVERSITY OF SCIENCE AND TECHNOLOGY, Thuwal (SA)

(72) Inventor: Georg Eitelhuber, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 98 days.

(21) Appl. No.: 14/903,050

(22) PCT Filed: Jul. 3, 2014

(86) PCT No.: PCT/IB2014/002255
§ 371 (c)(1),
(2) Date: Jan. 5, 2016

(87) PCT Pub. No.: WO2015/004535
PCT Pub. Date: Jan. 15, 2015

(65) Prior Publication Data
US 2016/0144870 A1   May 26, 2016

Related U.S. Application Data

(60) Provisional application No. 61/843,107, filed on Jul. 5, 2013.

(51) Int. Cl.
*B08B 1/04* (2006.01)
*B08B 1/00* (2006.01)
(Continued)

(52) U.S. Cl.
CPC .............. *B08B 1/008* (2013.01); *B08B 1/002* (2013.01); *B08B 1/04* (2013.01); *B61B 13/02* (2013.01);
(Continued)

(58) Field of Classification Search
CPC .. B08B 1/002; B08B 1/008; B08B 1/04; F24J 2/461
See application file for complete search history.

(56) References Cited

U.S. PATENT DOCUMENTS 5,323,508 A * 6/1994 Sheldrake ................ A47L 1/02
  15/103
9,192,966 B2 * 11/2015 Zanatta .................... F24J 2/461
(Continued)

FOREIGN PATENT DOCUMENTS

CN    101229545 A    7/2008
CN    101389414 A    3/2009
(Continued)

OTHER PUBLICATIONS

International Search Report and Written Opinion for PCT/IB2014/002255 dated Feb. 10, 2015.
(Continued)

*Primary Examiner* — Zachary L Kuhfuss
(74) *Attorney, Agent, or Firm* — Patent Portfolio Builders PLLC

(57) ABSTRACT

An apparatus, system, and method for conveying an assembly along a track. A rail can include a first planar side, a second planar side, and a third planar side. The first, second, and third planar sides can be arranged to form at least two acute angles. A carriage assembly can include a drive wheel and at least two roller sets. The drive wheel can be configured to contact the first planar side and is configured to translate the carriage assembly along the rail. The at least two roller sets can be configured to contact the two other sides to maintain the carriage in contact with the rail.

21 Claims, 13 Drawing Sheets

(51) Int. Cl.
  *F24S 40/20*    (2018.01)
  *F16C 29/00*    (2006.01)
  *F16C 29/04*    (2006.01)
  *H02S 40/10*    (2014.01)
  *B61B 13/02*    (2006.01)
  *F24S 25/35*    (2018.01)
  *F24S 25/33*    (2018.01)
  *F24S 25/00*    (2018.01)

(52) U.S. Cl.
  CPC .......... *F16C 29/005* (2013.01); *F16C 29/045* (2013.01); *F24S 25/33* (2018.05); *F24S 25/35* (2018.05); *F24S 40/20* (2018.05); *H02S 40/10* (2014.12); *F24S 2025/801* (2018.05); *Y02E 10/47* (2013.01)

(56) References Cited

U.S. PATENT DOCUMENTS

| | | | | |
|---|---|---|---|---|
| 9,355,873 | B2* | 5/2016 | Eitelhuber | H01L 21/67046 |
| 2001/0010103 | A1 | 8/2001 | Konishi et al. | |
| 2011/0094549 | A1* | 4/2011 | Lin | B08B 1/008 134/198 |
| 2013/0037051 | A1* | 2/2013 | Eitelhuber | H01L 21/67046 134/6 |
| 2013/0048026 | A1* | 2/2013 | Lee | B08B 1/008 134/18 |
| 2013/0086761 | A1* | 4/2013 | Singh | B08B 1/008 15/77 |
| 2013/0097790 | A1* | 4/2013 | Liao | A47L 1/02 15/88.4 |
| 2013/0206173 | A1* | 8/2013 | Zijlstra | B08B 1/008 134/6 |
| 2013/0306106 | A1* | 11/2013 | Meller | B08B 1/008 134/6 |
| 2014/0109334 | A1* | 4/2014 | Saraf | B08B 1/008 15/246 |
| 2015/0144156 | A1* | 5/2015 | French | H02S 40/10 134/6 |
| 2015/0244311 | A1* | 8/2015 | Nakagawa | B08B 1/04 134/180 |
| 2016/0294319 | A1* | 10/2016 | Ram | B08B 1/008 |
| 2017/0070189 | A1* | 3/2017 | Hartman | H02S 40/10 |
| 2017/0179873 | A1* | 6/2017 | Eitelhuber | H02S 40/10 |

FOREIGN PATENT DOCUMENTS

| | | |
|---|---|---|
| CN | 102345714 | 2/2012 |
| DE | 7322980 | 10/1973 |
| DE | 202009012816 | 12/2009 |
| EP | 1980763 | 10/2008 |
| EP | 2042759 | 4/2009 |
| JP | 2011040592 A | 2/2011 |
| KR | 20110001748 A | 1/2011 |
| WO | 2006/074069 | 7/2006 |
| WO | 2013/017960 | 2/2013 |

OTHER PUBLICATIONS

Office Action in corresponding Cooperation Council for the Arab States of the Gulf Application No. GC 2014-27497 dated Aug. 29, 2016. (Reference DE 733980 was submitted with an Information Disclosure Statement on Jan. 5, 2016.).

AU Examination Report No. 1 in related AU Application No. 2014288933, dated Jun. 7, 2017 (Document DE 7322980 was cited in IDS filed Jan. 5, 2016).

Office Action in corresponding Chinese Application No. 2014800439816 dated Feb. 6, 2017 (References DE 7322980 and WO 2013017960 were submitted with the IDS filed Jan. 5, 2016).

First Office Action in related Chilean Patent Application No. 201600005, dated Nov. 30, 2017 (Cited references were previously provided in the IDS dated Jan. 5, 2016).

Examination Report No. 2 for standard patent application in related AU Application No. 2014288933, dated Sep. 20, 2017 (DE 7322980 cited in IDS filed Jan. 5, 2016).

Second Office Action in related State Intellectual Property Office of the People's Republic of China dated Aug. 11, 2017.

Second Office Action in related Chilean Patent Application No. 201600005, dated May 4, 2018.

Communication pursuant to Article 94(3) EPC dated Dec. 11, 2018 in corresponding/related EP Application No. 14809092.1 (DE 7322980 and ISR/WO were provided in the IDS filed Jan. 5, 2016).

Chinese Fourth Office Action issued Dec. 5, 2018 in corresponding/related Chinese Application No. 201480043981.6 (References D1 and D2 were provided in the IDS filed Jan. 5, 2016 and reference D3 was provided in the IDS filed Apr. 18, 2017).

* cited by examiner

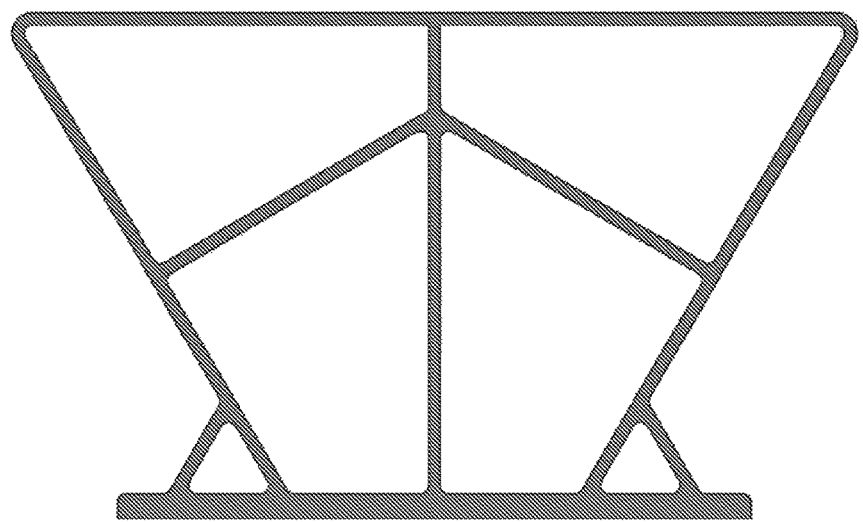
Figure 5
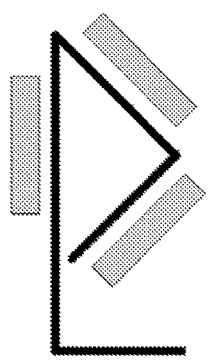 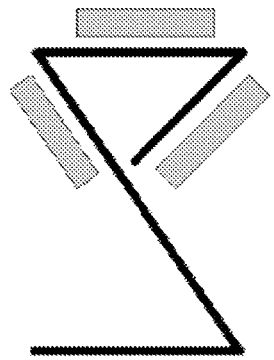 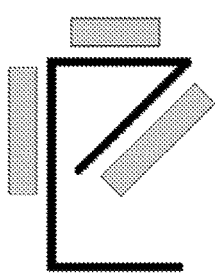
Figure 6A          Figure 6B          Figure 6C

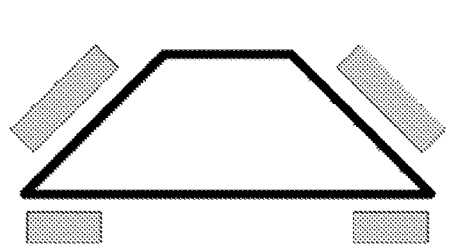
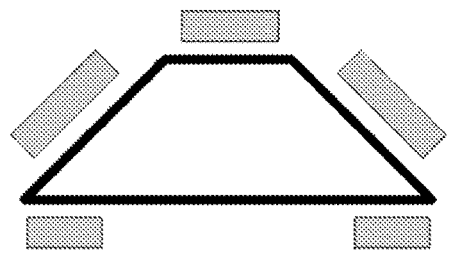
Figure 8A  Figure 8B
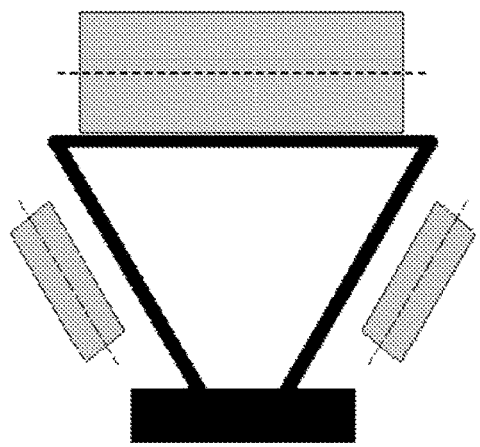
Figure 9
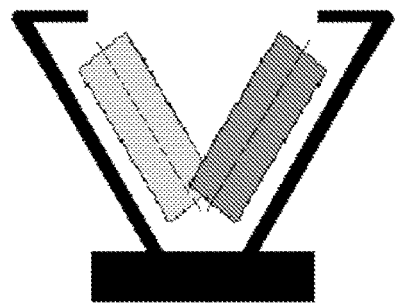
Figure 10

US 10,293,381 B2

SYSTEM AND METHOD FOR CONVEYING AN ASSEMBLY

CLAIM OF PRIORITY

This application claims the benefit under 35 USC 371 to International Application No. PCT/IB2014/002255, filed Jul. 3, 2014, which claims priority to U.S. Provisional Application No. 61/843,107, filed on Jul. 5, 2013, each of which is incorporated by reference in its entirety.

TECHNICAL FIELD

The present invention is directed to a system and method for translating an assembly along a track, such as a duster for dusting a photovoltaic array.

BACKGROUND

The efficiency of a solar panel is measured by the ratio of the amount of sunlight it receives to the amount of electricity it generates. After a solar panel is installed, dust and other debris typically begins to accumulate on the solar panel surfaces. Dust accumulated on a solar panel reduces the number of photons reaching the photovoltaic elements and thereby reduces the power the solar panel can generate during a unit of time. In other words, dust can significantly reduce the efficiency of the solar panel. Therefore, many systems include a solar panel cleaning system to improve the efficiency of solar panels.

Solar panel cleaners in the prior art can be categorized as manual and automated types. Manual cleaners generally include manually operated sweeping brushes, power washers, and powered brushes. Automated cleaners generally include buffer-style and rotating bristle-style devices. Prior rotating bristle-style cleaners generally use a system for translating the brush while the rotational axis of the brush is maintained in an orientation that is perpendicular to the direction of travel. In other words, the top and bottom of the brush sweep across the panel at an even rate without one moving out ahead of the other. Complicated and mechanically inefficient systems are typically required to maintain the rotating brush in a perpendicular orientation as it traverses the solar panels. Changes in temperature and other variables can affect the functioning of such dusters.

Typically, most solar panel cleaning systems also use liquid cleaning solutions or water for cleaning the solar panels. The moistened dust and debris may become sticky and adhere to the surfaces of the solar panel, which can complicate the cleaning process. This is especially true in hot arid regions where solar panels are often found. A further problem with using water in arid regions is in maintaining or supplying water at the site of the solar array.

SUMMARY

In an aspect, a track system can include a rail and a carriage assembly. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side and can be configured to translate the carriage assembly along the rail. A first roller set of the at least two roller sets can be configured to contact the second planar side, and a second roller set of the at least two roller sets can be configured to contact the third planar side.

In some embodiments, the track system can include a motor. The motor can be configured to actuate the drive wheel and translate the carriage assembly. The drive wheel can be a load bearing roller. The carriage assembly can further include a pivot. The pivot can be configured to pivot an attached component. In other embodiments, the drive wheel and the at least two rollers can be configured to maintain the carriage assembly in contact with the rail.

In some embodiments, the rail can be formed of a cold rolled metal, for example cold rolled steel, and/or the rail can be formed of an extruded metal, such extruded aluminum. The at least two rollers can comprise a silicon material, a metal material and/or a polymer material. The rail can be solid or hollow. The rail can include internal support structures and hollow areas.

In another aspect, a conveying method can include the steps of providing a rail, providing a carriage assembly, and translating the carriage assembly along the rail. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side. A first roller set of the at least two roller sets can be configured to contact the second planar side. A second roller set of the at least two roller sets can be configured to contact the third planar side.

In some embodiments, the method can include actuating a motor the drive wheel to translate the carriage assembly. The drive wheel can be a load bearing roller. The drive wheel and the at least two rollers maintain the carriage assembly in contact with the rail.

In embodiments, the method can include pivoting an attached component, such as an assembly. The rail can be formed of a cold rolled metal and/or an extruded metal. The drive wheel and the at least two rollers comprise a silicon material, a metal material, and/or a polymer material.

In an aspect, a cleaning apparatus can include a brush assembly, a drive, and a pivot. The brush assembly can include at least one rotatable brush having a rotational axis. The drive can be configured to translate the brush assembly parallel to a track. The pivot can be configured to pivot the rotational axis in a plane parallel to the track and the rotational axis.

In embodiments, the cleaning apparatus can include a trailing assembly slidably attached to the brush assembly. The trailing assembly can be configured to translate along a second track. The pivot can be configured to allow the brush assembly to pivot in the plane to an angle that is not perpendicular to the track. The angle can be between 30 deg. and 80 deg., between 40 deg. and 75 deg., between 50 deg. and 70 deg., and/or between 55 deg. and 65 deg. The angle can be less than 60 deg.

In some embodiments, the drive can include a drive motor. The brush assembly can include a brush motor configured to rotate the at least one rotatable brush about the rotational axis. The at least one rotatable brush can include a sweeping member. In some embodiments, the sweeping member can have a bristle pattern parallel to the rotational axis. The sweeping member can comprise a polymer, a natural fiber, and/or metal bristles. The sweeping member can comprise a foam or spongy material.

In embodiments, the at least one rotatable brush can include a shaft extending along the rotational axis and a sweeping member coupled to the shaft and configured to be rotatable about the rotational axis. The pivot can be configured to rotate the shaft clockwise and/or counter-clockwise, as well as in a plane parallel to a solar panel or other element such as a window or mirror. The rotational axis is not perpendicular to the direction of the track while the cleaning apparatus is in an operational configuration.

In another aspect, a method of cleaning can include the steps of providing a brush assembly, pivoting the rotational axis of a rotatable brush, and translating the brush assembly parallel to a track. The brush assembly can include at least one rotatable brush having a rotational axis. The plane defined by pivoting the rotational axis can be in a plane parallel to the track.

In some embodiments, the method can include providing a trailing assembly slidably attached to the brush assembly and translating the trailing assembly along a second track. In other embodiments, the method can include pivoting the brush assembly in the plane to an angle that is nonperpendicular to the track. The angle can be between 30 deg. and 80 deg., between 40 deg. and 75 deg., between 50 deg. and 70 deg., and/or between 55 deg. and 65 deg. The angle can be less than 60 deg.

In other embodiments, the method can include operating a brush motor to rotate the at least one rotatable brush about the rotational axis. The at least one rotatable brush can include a sweeping member having a bristle pattern parallel to the rotational axis.

In an aspect, a photovoltaic array can include a rail and a solar panel mounted to the rail. The rail can include a first planar side, a second planar side, and a third planar side. The first, second, and third planar sides can be arranged to form at least a first acute angle and a second acute angle.

In some embodiments, the rail can be formed of a cold rolled metal and/or an extruded metal.

In some embodiments, the array can further include a carriage assembly and a brush assembly. The carriage assembly can include a pivot, a drive wheel, and at least two roller sets. The brush assembly can include at least one rotatable brush having a rotational axis. The brush assembly can be pivotally attached to the carriage assembly.

In other embodiments, the drive wheel can be configured to contact the first planar side and can be configured to translate the carriage assembly along the rail. A first roller set of the at least two roller sets can be configured to contact the second planar side. A second roller set of the at least two roller sets can be configured to contact the third planar side.

In yet other embodiments, the solar panel can be further mounted to a second rail. The rail and the second rail can be in a plane substantially parallel to a solar panel. The second rail can include three planar sides arranged to form at least a third acute angle and a fourth acute angle.

In some embodiments, the array can include a trailing carriage assembly slidably attached to the brush assembly. The trailing carriage can include at least three roller sets. The at least three roller sets include at least one drive wheel.

In other embodiments, the rotational axis can be nonperpendicular to the rail when the photovoltaic array is in an operational configuration.

In yet other embodiments, the array can include a housing for containing a brush assembly. The brush assembly can include at least one rotatable brush having a rotational axis. The brush assembly can be pivotally attached to a carriage assembly.

In some embodiments, the array can include a mounting frame configured to maintain the solar panel in relation to the rail. The mounting frame can include a c-shape cross section and a material for securing the solar panel. The material can be a polymer, an elastomer, an adhesive, and/or a resin.

In an aspect, a track system can include a channel and a carriage. The channel can include a first planar side and a second planar side. The first and second planar sides can be arranged at an acute angle. The carriage assembly can include a drive wheel and at least two rollers. The drive wheel can be in contact with the first planar side and can be configured to translate the carriage assembly along the channel. At least one of the at least two rollers can be in contact with the second planar side.

In some embodiments, the carriage assembly can further include a pivot. In other embodiments, the track system can include a means for dust abatement. The means for dust abatement can include a flexible hood and/or bristles, for instance, along the top of the channel. The means can include egress apertures along the bottom and/or sides of the channel. Additionally, a skirt around the pivot and sliding members can be utilized to prevent dust and debris from falling into the channel. Further, the assembly components can be disposed in a housing to seal them from dust and dirt.

In other embodiments, the system can include a brush assembly. The brush assembly can include one or more rotatable brushes, each having a rotational axis. The pivot can be configured to pivot the brush assembly.

In yet other embodiments, the system can include a panel. The panel can be a photovoltaic solar panel, a window, and/or a mirror. The panel can be mounted to the channel. The top of the channel can be substantially flush with the panel. The pivot can be configured to allow pivoting the rotational axis in a plane parallel to the panel. The carriage assembly can be configured to translate the brush assembly in a direction that is nonperpendicular to the rotational axis.

In another aspect, a method of conveying can include the steps of providing a channel, providing a carriage assembly, and translating the carriage assembly along the channel. The channel can include a first planar side, a second planar side, and an open face. The first and second planar sides can be arranged at an acute angle. The carriage assembly can include a drive wheel and at least two rollers. The drive wheel can be in contact with the first planar side. At least one of the at least two rollers can be in contact with the second planar side.

In some embodiments, the carriage assembly can further include a pivot. The method can further include abating dust ingress into the channel.

In other embodiments, the method can include providing a brush assembly and pivoting the brush assembly. The brush assembly can include one or more rotatable brushes each having a rotational axis.

In yet other embodiments, the open face of the channel can be substantially flush with a panel. The method can further include pivoting the rotational axis in a plane parallel to the panel, and translating the brush assembly in a direction that is nonperpendicular to the rotational axis.

BRIEF DESCRIPTION OF THE DRAWINGS

Embodiments are further described in the detailed description which follows, in reference to the noted plurality of drawings by way of non-limiting examples of certain embodiments of the present invention, in which like numerals represent like elements throughout the several views of the drawings, and wherein:

FIG. 5 depicts an exemplary cross section of a rail.

FIGS. 6A-6C depict exemplary configurations of rail cross sections.

FIGS. 8A and 8B depict cross sections of exemplary rails.

FIG. 9 depicts an exemplary cross section of an external rail track.

FIG. 10 depicts an exemplary cross section of an internal rail track.

DETAILED DESCRIPTION

Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention. As an example, the description below discusses panels primarily with respect to photovoltaic solar panels. Nonetheless, the term panel can mean a window, such as a skylight, a mirror, or any plane for which the cleaning system can be utilized.

Applicant hereby incorporates by reference in its entirety U.S. application Ser. No. 13/567,205, filed by Inventor Georg Eitelhuber on Aug. 6, 2012. The application was published as US 2013/0037051 A1 on Feb. 14, 2013. The language and embodiments of the application will not be repeated herein for the purpose of brevity.

Figure 1:
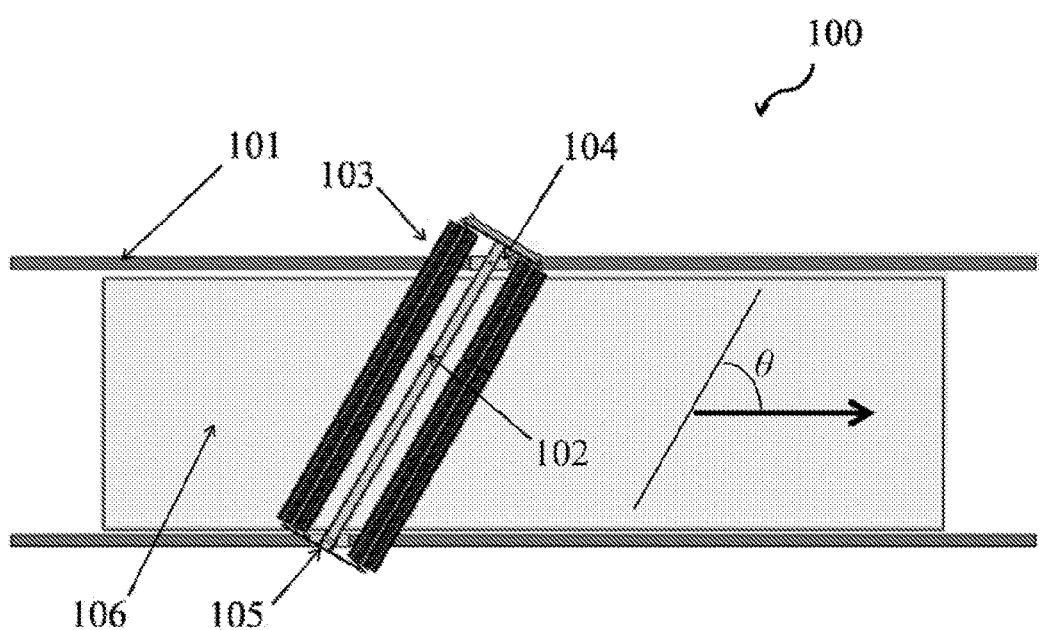
FIG. 1 depicts an exemplary system in an operational position.

An exemplary embodiment is shown schematically in FIG. 1. The track and cleaning system (100) can have a brush assembly (102) with at least one rotatable brush (103) having a rotational axis. A drive can be configured to translate the brush assembly parallel to the rail (101). A carriage assembly (104) for translating the brush assembly can have a pivot, which can be configured to allow pivoting of the rotational axis in a plane parallel to the rails and the rotational axis, which is also parallel to panel (106). The pivoting action can further be aided by a trailing assembly (105), which can have another pivot that is slidably attached to the brush assembly. Directional arrow shows the direction of travel of the brush and carriage assemblies. The angle, θ, between the direction of travel and the rotational axis of the brushes can be less than ninety degrees when the duster is operating.

Figure 2A:
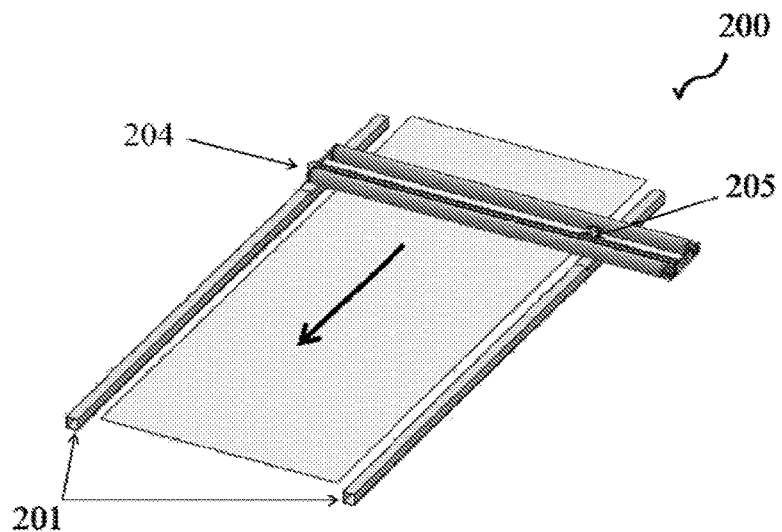
FIGS. 2A-2C depict an exemplary system in initial, intermediate, and operational configurations.
Figure 2B:
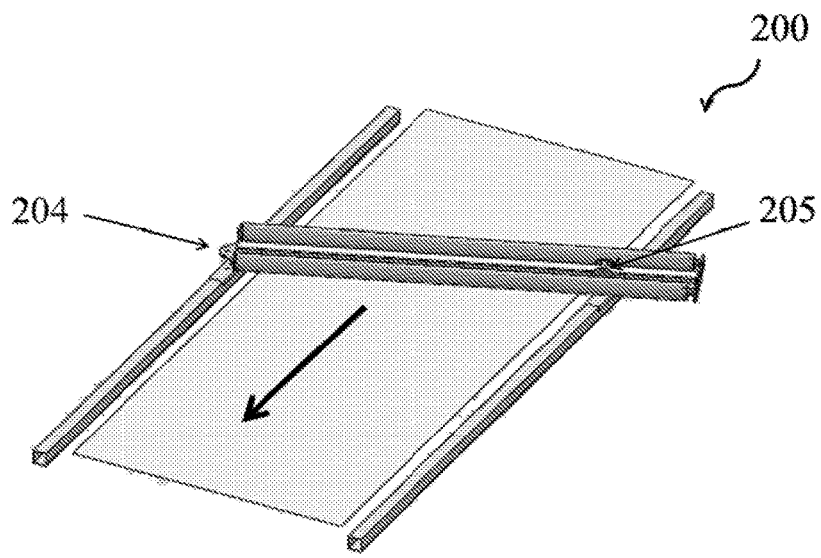
Figure 2C:
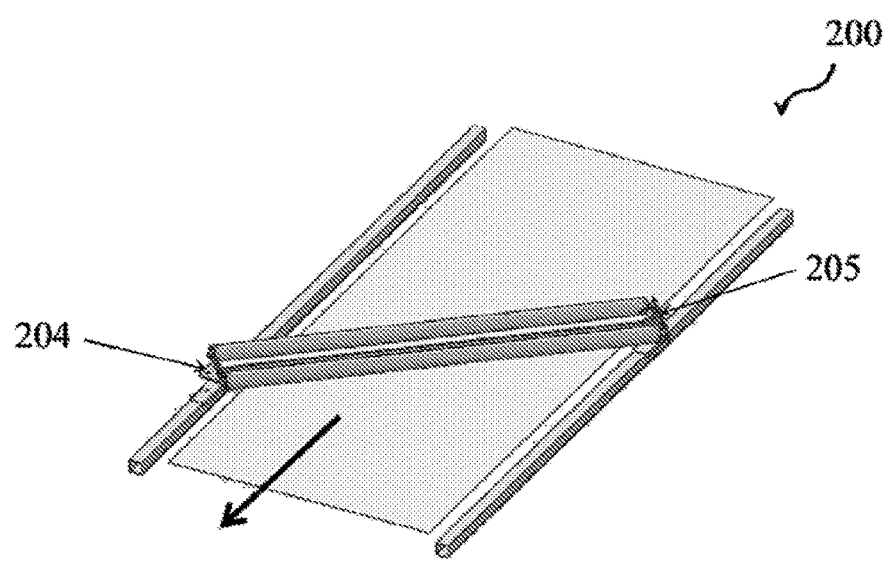

FIGS. 2A-2C show a cleaning system in an initial configuration, as well as two operational configurations. As the carriage assembly (204) is driven across the panel, the pivots in the carriage (204) and trailing (205) assemblies can allow the longitudinal axis of the brushes to rotate parallel to the panel. Initially, the brushes can overhang the trailing assembly. This distance or overhang can decrease as the brushes rotate into an operating position, as shown in FIGS. 2B and 2C.

An advantageous aspect of the system is the way the device can slide up into an angled position that can allow the top end to lead. This can allow dust and debris to fall forward and away from the brush-panel interface. The unique roller support on the bottom of the brush assembly can allow the system to be supported by a cart, always directly over the rail.

Leading the top edge of the brush assembly cart dramatically increase effectiveness of the cleaning in several ways. The dust at the top need not be re-brushed many times on the way down after being dislodged, as can happen if the brush is constrained vertically.

Further, the bristle pattern on the brushes can be straight instead of spiral. This can facilitate flicking the dust and debris from the surface, rather than grinding them across the panel surface by lateral relative velocity of a bristle spiral. Yet because of the nonperpendicular angle, with respect to the direction of travel, dust and debris can still be directed towards the bottom edge more rapidly.

In an embodiment, the solar panel cleaning system can incorporate one or more support assemblies to support the brushes. The system can also have one or more motors to operate the rotatable brushes and/or a drive wheel. The rotatable brushes can move across a panel in a direction, for example as shown by the directional arrows in FIGS. 1-4, and/or in the opposite direction. Additionally, the rotatable brushes can pivot to a certain degree across the surface.

When in a run position, i.e. an operational position, the angle θ between the direction of travel, defined by the direction of the track, and the rotational axis, defined by the longitudinal axis of one or more of the brushes, can be between zero and 180 degrees. When the brushes are in rest position, the rotational axis can be perpendicular to the rails. Further, the rotatable brushes can be rotated counter-clockwise and/or clockwise from a rest position to reach an operating position.

The embodiment of FIG. 2C shows an operating configuration where the angle has been defined by the length of the brush assembly. Once the sliding member reaches the end of the brush assembly, the trailing assembly can be pulled by the driven carriage assembly at a defined angle. The embodiment of FIG. 2B shows an operating configuration in which the brush assembly is allowed to pivot until an equilibrium angle is achieved. The mechanical advantages in the embodiments are manifold. For example, the tracks can have very large tolerances for lateral distance apart, and the brush can simply find its own angle comfortably. For straight brushes, conversely, such changes in the lateral angle would result in the system pulling itself apart. Exemplary operating angles can include 30 to 80 degrees, 40 to 75 degrees, 50 to 70 degrees, 55 to 65 degrees, and/or less than 60 degrees.

Figure 3A:
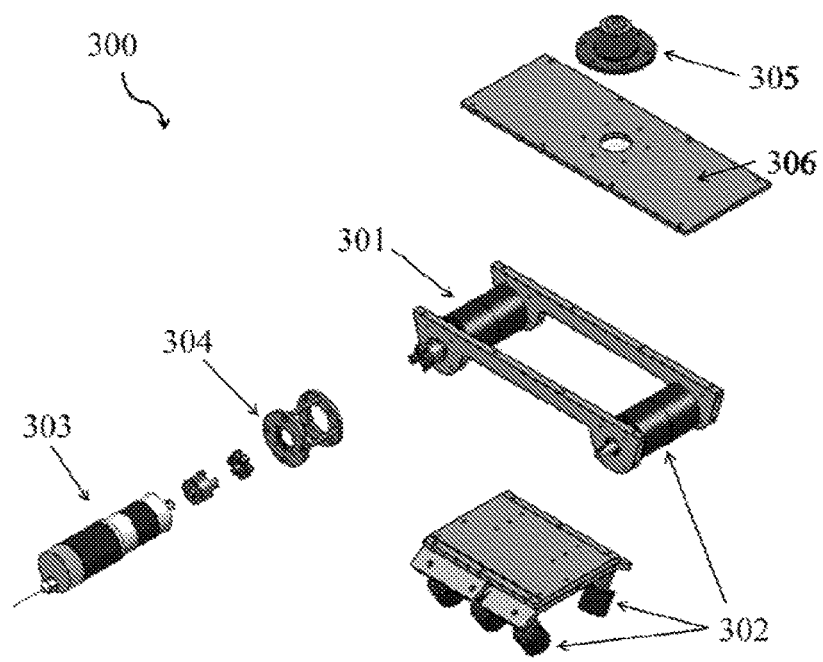
FIGS. 3A and 3B depict an exemplary carriage assembly.
Figure 3B:
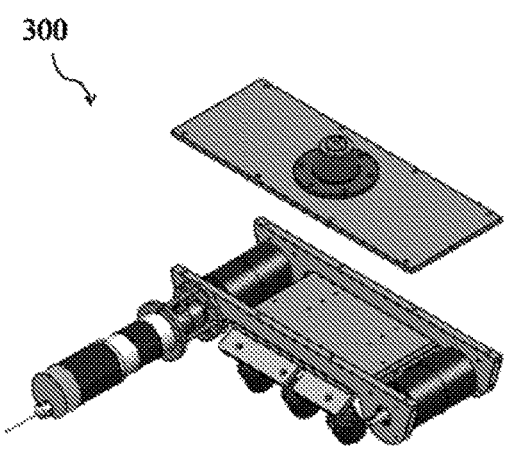

FIGS. 3A and 3B are an exploded view and a substantially assembled depiction of the carriage assembly (300). The carriage can have one or more drive wheels. In the exemplary embodiment of FIG. 3, drive wheel (301) can be attached to motor (303) by means of a coupling (304). Rollers (302) can form a triangular shape when assembled so as to hold tight to a rail with a triangular cross section. The term roller herein can mean wheel, caster, bearing, roller bearing, and/or other elements. The carriage can further have a pivot (305) mounted to a pivot plate (306) or be otherwise mounted.

Figure 4:
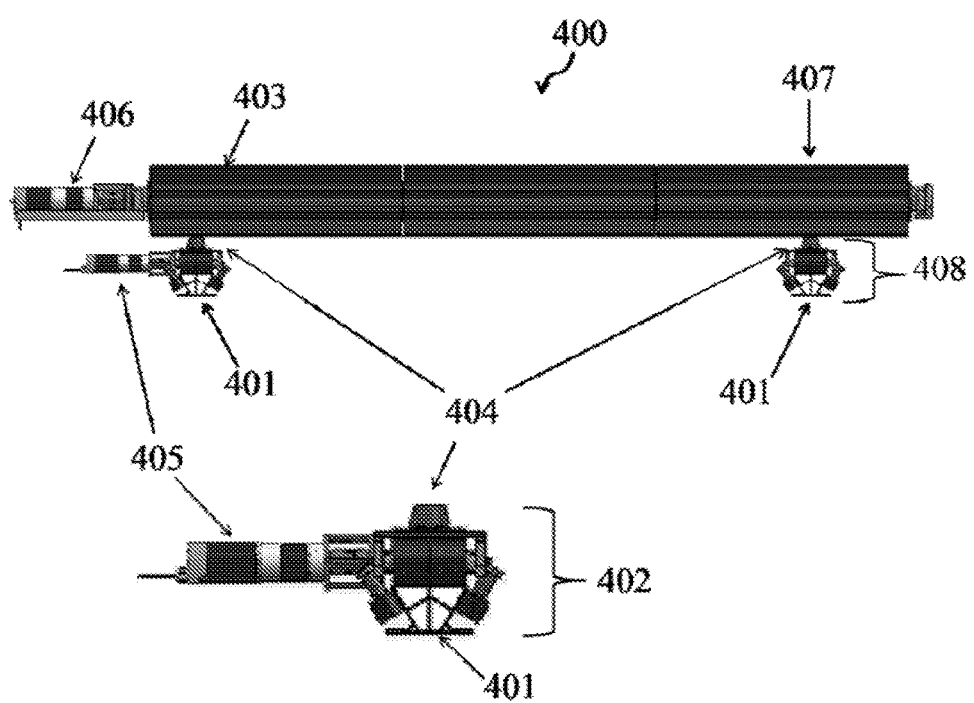
FIG. 4 depicts an exemplary track and cleaning system.

The triangular shape or the rollers is shown in the exemplary cleaning system (400) of FIG. 4. As can be seen, carriage assembly (402) can be configured to hold tight onto rails (401), which have a triangular cross section. A closer view of the cross section of the rail, including hollow areas and exemplary internal support structures, can be seen in FIG. 5.

Referring again to FIG. 4, a brush assembly can frame rotatable brushes (403) and be attached to pivots (404). The brush assembly can thereby be attached to the drive wheel, via the carriage, assembly, and to the trailing assembly (408), via a slidable pivot (407). The rotatable brushes can include a shaft and a sweeping member. The sweeping member can be made of bristles comprising bristles, such as hair, plastic, and/or metal bristles. Alternatively, the sweeping member can be made of foam and/or sponge.

A brush assembly motor (406) can be used to actuate and/or rotate the rotatable, brushes about their longitudinal axes. The shaft can be coupled to a drive transmission. The brushes can rotate about their axes such that the part of the brush in contact with the surface moves in the same direction as the direction of travel of the brush assembly and/or in the opposite direction. The carriage assembly can be coupled to a drive motor (405). Although not shown in FIG. 4, the trailing assembly can also be coupled to a drive motor, for example to facilitate returning the brushes to a perpendicular orientation for storing and/or to facilitate reversing the direction of travel. Alternatively, the brushes can be configured to return to a perpendicular orientation, with respect to the track, simply by continuing to rotate the brushes as the drive motor translates the brush assembly to its starting position opposite the directional arrow.

In an embodiment, there can be one motor to operate the rotatable brushes. The brushes can be configured to rotate in the same direction synchronously or in two different directions through the use of gears. Gearing can be utilized to rotate different brushes of a multi-brush assembly at different speeds. In an embodiment there may be two or more motors. In such an embodiment, several brushes can be individually operated by different motors.

FIG. 5 shows a rail having a triangular cross section. The shape and internal support features can be achieved an extrusion process. The rail can be, for example, extruded aluminum. Such is advantageous as the rail can be very stiff and rigid. Moreover, such a rail can have a closed configuration and can have good bending moment characteristics.

FIGS. 6A-6C show alternative rail configurations that can be advantageously fabricated from cold rolling processes. Such materials as cold rolled steel provide many benefits. The rails can be long, without seams, and very strong. Cold rolled rails can be very stiff, and ordinary cold rolled steel can be utilized inexpensively. Moreover, cold rolled metal can further act as a load bearing member to provide structural support, for example, to an entire photovoltaic array. The grey rectangles in FIGS. 6A-6C represent roller positions around the rail. An advantage to the triangular cross sections in FIGS. 5 and 6 is that the number of rollers for maintaining the carriage and/or trailing assemblies on the rails is minimized.

Figure 7:
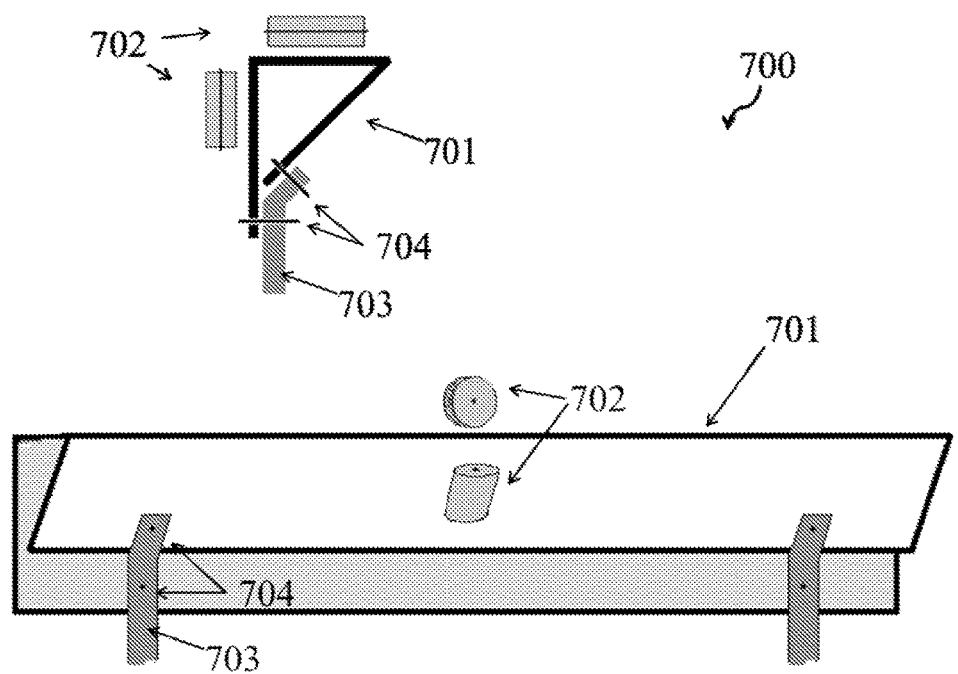
FIG. 7 depicts two views of an exemplary track.

FIG. 7 shows a track system (700) that can include a rail (701). Rollers (702) can be utilized on all three of the planar faces of the rail. The rail can include intermittent supports (703) and fasteners (704), such as bolts and/or rivets. The intermittent supports can be, though need not be, attached to a solar panel support or to a solar panel directly. If made for the track alone, and not a load bearing member, intermittent supports can be used to attach the track to the main support. The supports can provide additional stiffness to the cross section of the rail by joining the two parts of the rail intermittently.

Although an advantage of the present system is in the minimization of the number of rollers and/or roller assemblies required, it may be advantageous and/or convenient to use rollers on four or five faces of a track. FIGS. 8A and 8B shows contemplated rail configurations, as well as various roller positions.

Two alternative embodiments are shown in FIGS. 9 and 10. FIG. 9 shows an external rail configuration with a triangular cross section. A drive wheel is represented by the large rectangle on top and two sets of complimentary rollers are represented by the rectangles on either side of the rail. In FIG. 10, the rollers are internal to the rail. An internal rail can be beneficial is it can be more compact than an external rail. Moreover, as will be shown, an internal rail can allow a brush system to be disposed close to the plane of a surface by mounting the rail such that the top of the channel is flush with the surface to be swept.

Figure 11:
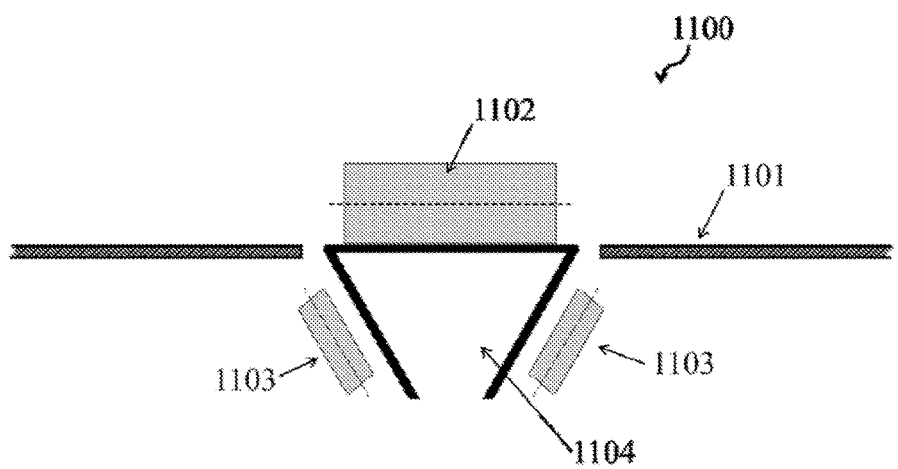
FIG. 11 depicts an exemplary embodiment of a photovoltaic array system.
Figure 12:
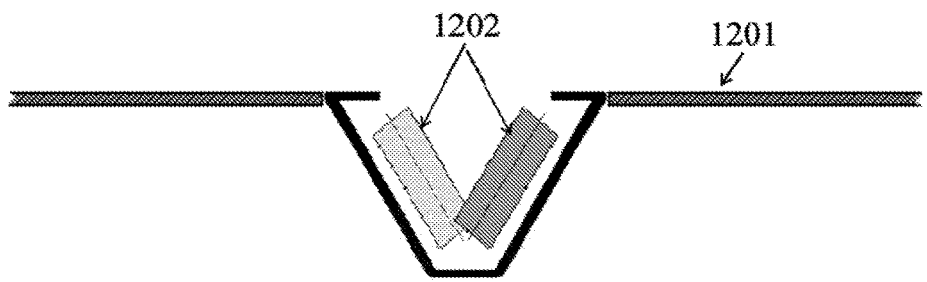
FIG. 12 depicts an exemplary embodiment of a photovoltaic array system.

FIGS. 11 and 12 show two configurations for positioning a solar panel cleaning system (1100) close to the surface to be cleaned, for example a solar panel surface (1101). A primary roller (1102), i.e. a load-bearing drive wheel, is positioned on top of a triangular rail (1104). The top surface of the rail has been disposed in the plane of the solar panel surface. Complementary rollers (1103) are shown on either side of the triangular rail. In FIG. 12, the rollers can be more compactly configured within the channel of the rail, dramatically reducing the profile of the cleaning system. Further, the configuration can allow the rail and cleaning system to be disposed very close the surface to be cleaned. It can be advantageous to include means for dust abatement, such as a flexible hood or bristles along the top of the channel and/or egress apertures along the bottom of the channel. Additionally, a skirt around the pivot and sliding members can be utilized to prevent dust and debris from falling into the channel. Further, the assembly components can be disposed in a housing to seal them from dust and dirt.

The system can further include a self-cleaning system configured to automatically clean the one or more rotatable brushes. The system can be integrated with a housing for the brushes or merely attached to an edge of a panel array. A self-cleaning member can include a stiff brush, a row of rake-like lines, a bar, or other effective elements against which the rotating brushes can pass while rotating and thereby eliminate excess dust and debris buildup.

Figure 13:
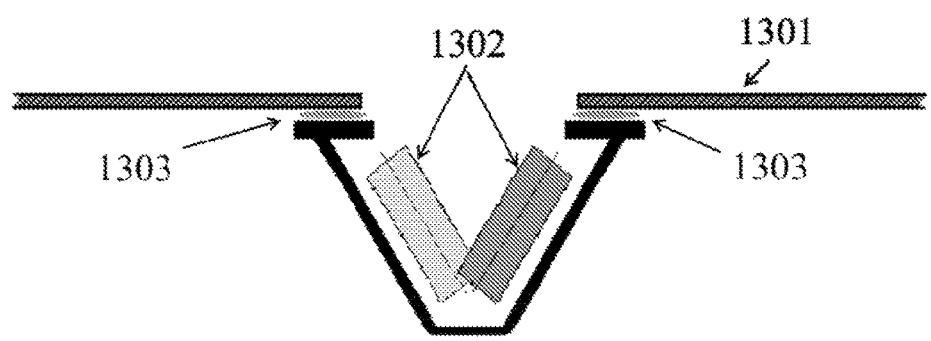
FIG. 13 depicts an exemplary embodiment of a photovoltaic array system.
Figure 14:
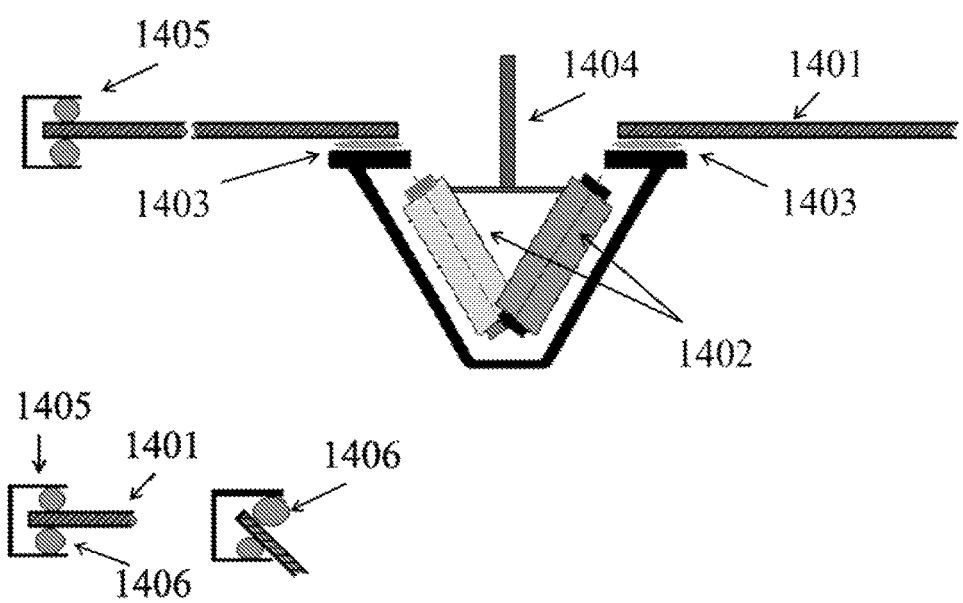
FIG. 14 depicts an exemplary implementation of a photovoltaic array system.

In FIG. 13, similar to FIG. 12, the rollers (1302) can be disposed within a channel. The internal rail can be adhered to the solar panels (1301), for example with resin (1303). FIG. 14 additionally shows a pivot arm (1404) for attaching to a brush assembly. Rubber strips (1406) with circular cross sections can be attached inside support frame members (1405) having a C-shaped cross section. The members can be used to mount the solar panels (1401). The support frame can be bolted to a main array. The support frame can be part of the main array, for example as an integral part of an extrusion. As shown in FIG. 14, a panel can be inserted straight (where there is clearance), and then can be let down to an angle of tilt. This can crush the rubber strips, and can thereby cause a locking force on the panels. The other end of the panel can be held down either by a resin stick, by small clamp, and/or by an adhesive. Conversely, the rubber bits can be attached to the panels themselves for substantially the same effect.

Figure 15:
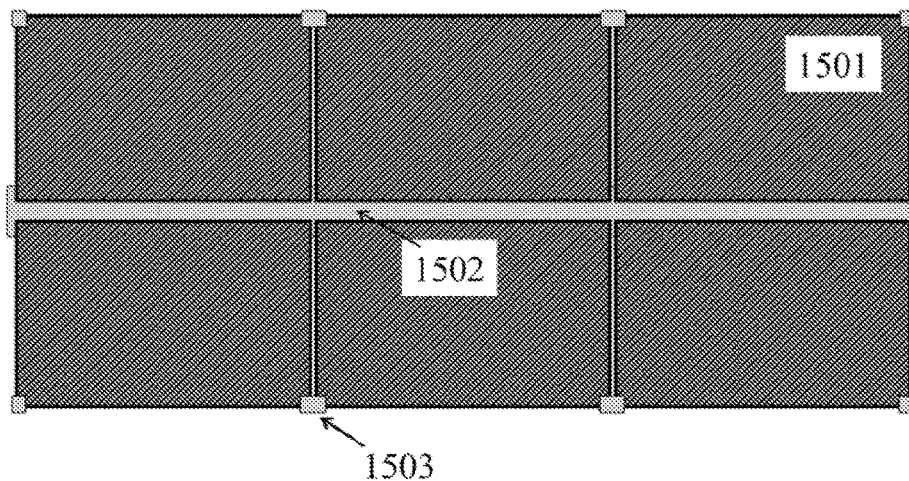
FIG. 15 depicts a photovoltaic array with a central track system.
Figure 16:
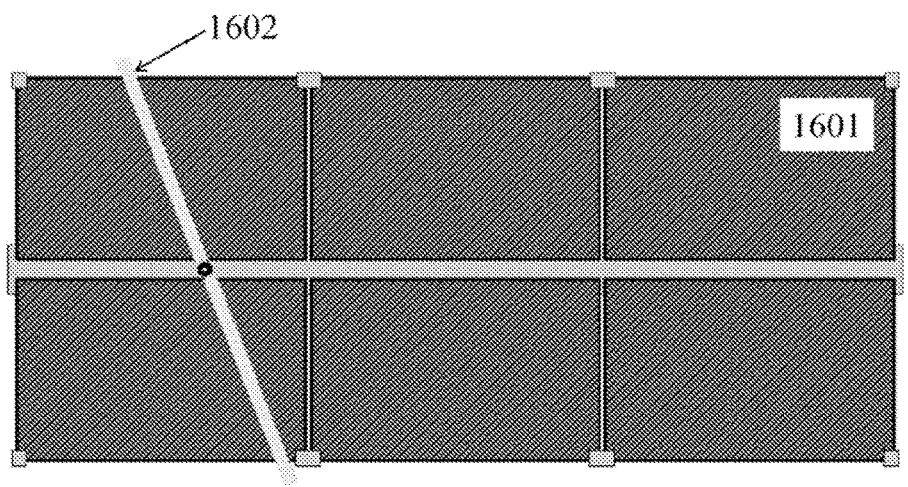
FIG. 16 depicts a photovoltaic array during operation of the system.

FIGS. 15-19 show various embodiments of a photovoltaic array. In FIG. 15 solar panels (1501) can be mounted to support structures (1503) and track (1502). The track can be an internal rail, such as a channel, or an external rail. As shown in FIG. 16, the cleaning system (1602) can be centrally mounted to a pivot connected to a carriage assembly which utilizes only a central track. Alternatively, trailing roller assemblies can be incorporated along the top, bottom, or top and bottom edges of the array of solar panels (1601), similar to embodiments shown in FIGS. 1-4.

Figure 17:
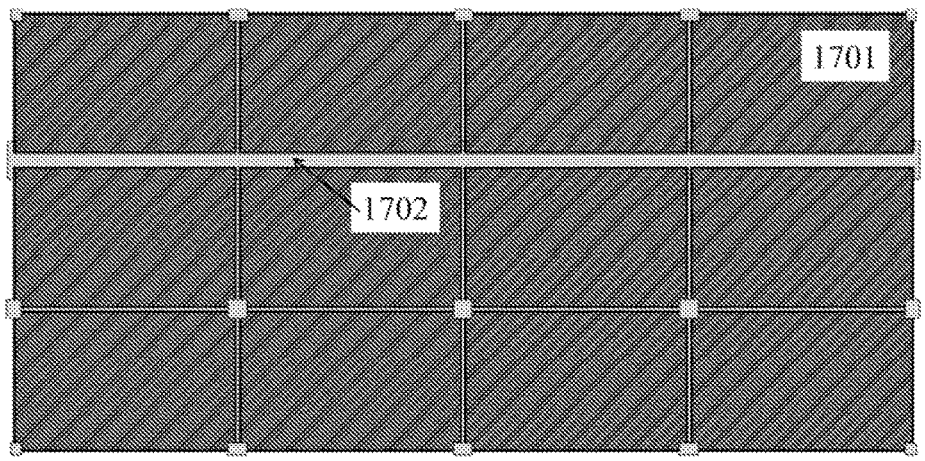
FIG. 17 depicts a photovoltaic array with an off-center track.
Figure 18:
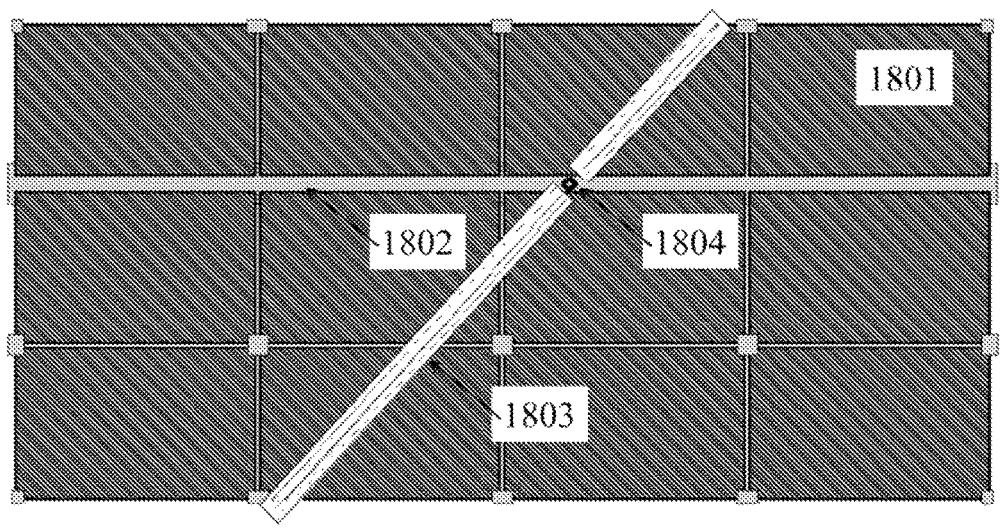
FIG. 18 depicts a photovoltaic array during operation of the system.

Referring to FIGS. 17 and 18, the array of solar panels (1701) can include a track (1702) that is off center. Here also, the track can be an internal rail, such as a channel, or an external rail. The carriage and pivot (1804) can be utilized alone or in combination with other roller assemblies to translate and pivot the cleaning system (1803).

For a centrally located track, it can be advantageous to incorporate a trailing assembly with its own drive or motor, or to incorporate a rolling resistance to facilitate pivoting. A motor can be integrated with the pivot to produce a power-actuated pivot.

Figure 19:
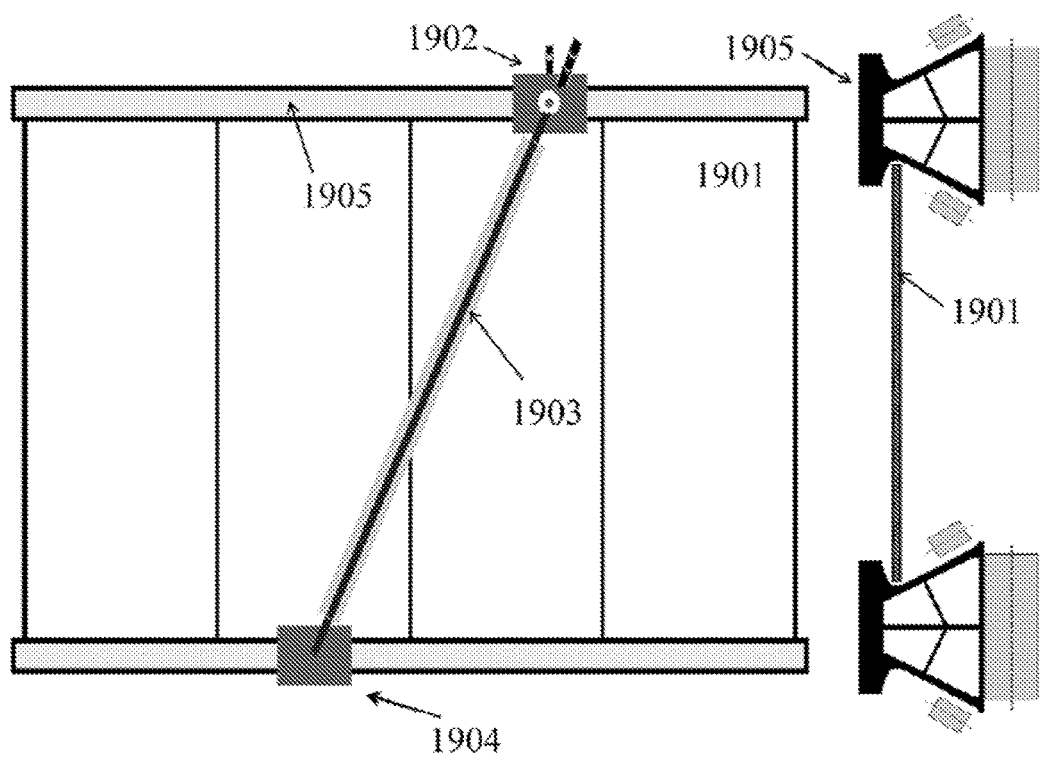
FIG. 19 depicts an overhead view and a cross sectional view of a photovoltaic array during operation of the system.

In FIG. 19, solar panels (1901) can be supported by and mounted to rails (1905). Brush assembly (1903) can be translated and operated by carriage assembly (1902). The translation, orientation, and support of the brush can further be facilitated by a trailing roller assembly (1904). As shown above, the carriage and the trailing assembly can have substantially similar roller configurations.

The cleaning system can further include a monitoring device to determine whether a cleaning is required. The device can include a meter of the output of the solar panels. Alternatively, the device can include sensor system for measuring the efficiency and/or effectiveness of the photovoltaic elements.

The monitoring device can be in communication with a control device. The control device can be configured to activate the cleaning system. The control device can be configured to send a signal indicating the status and/or the need for cleaning a panel. Additionally, the control device can be configured to send a signal indicating a fault or error in the array system, including in the cleaning system.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A cleaning apparatus, comprising:
   a brush assembly comprising at least one rotatable brush having a rotational axis;
   a drive having a carriage assembly and a trailing assembly, the carriage assembly being configured to translate the brush assembly along a first track and the trailing assembly being configured to follow, along a second track, parallel to the first track, the carriage assembly, wherein the trailing assembly is pulled, behind the carriage assembly, by the carriage assembly;
   the carriage assembly having a pivot configured to pivot the rotational axis in a plane parallel to the first track and the rotational axis;
   the carriage assembly having a drive wheel and a motor, the motor driving the drive wheel along the first track to translate the brush assembly; and
   the trailing assembly is slidably attached to the brush assembly so that the trailing assembly slides between opposite ends of the brush assembly.

2. The cleaning apparatus of claim 1, wherein the trailing assembly comprises a pivot that is slidably attached to the brush assembly, wherein the trailing assembly is configured to translate along the second track.

3. The cleaning apparatus of claim 2, wherein the pivot of the carriage assembly is configured to allow the brush assembly to pivot in the plane to an angle that is not perpendicular to the first and second tracks.

4. The cleaning apparatus of claim 3, wherein the angle is between 30 deg. and 80 deg., or wherein the angle is between 40 deg. and 75 deg., or wherein the angle is between 50 deg. and 70 deg., or wherein the angle is between 55 deg. and 65 deg., or wherein the angle is less than 60 deg.

5. The cleaning apparatus of claim 4, wherein the brush assembly comprises a brush motor configured to rotate the at least one rotatable brush about the rotational axis.

6. The cleaning apparatus of claim 1, wherein the at least one rotatable brush comprises a sweeping member having a bristle pattern parallel to the rotational axis, or wherein each of the at least one rotatable brush comprises a shaft extending along the rotational axis and a sweeping member coupled to the shaft and configured to be rotatable about the rotational axis;
   wherein the pivot of the carriage assembly is configured to rotate the shaft clockwise and counter-clockwise parallel to a solar panel; and
   wherein the rotational axis is not perpendicular to the direction of the first track while the cleaning apparatus is in an operational configuration.

7. The cleaning apparatus of claim 1, wherein the carriage assembly moves ahead of the trailing assembly while both the carriage assembly and the trailing assembly move along the first and second tracks, respectively.

8. The cleaning apparatus of claim 1, wherein the rotational axis is perpendicular to the first and second tracks when the carriage assembly and the trailing assembly are at rest and the rotational axis makes an angle smaller than 90° with the first and second tracks when the carriage assembly and the trailing assembly move along the first and second tracks, respectively.

9. The cleaning apparatus of claim 1, wherein the carriage assembly pulls the trailing assembly so that both the carriage assembly and the trailing assembly move along the first and second tracks, respectively.

10. The cleaning apparatus of claim 1, wherein the carriage assembly comprises:
    rollers that run along the first track, wherein the rollers and the drive wheel are configured to have a triangular shape.

11. The cleaning apparatus of claim 10, wherein the first track has a triangular cross section.

12. The cleaning apparatus of claim 11, wherein each of the drive wheel and the rollers contacts a corresponding face of the first track.

13. A cleaning apparatus, comprising:
    a brush assembly comprising at least one rotatable brush having a rotational axis;

a drive having a carriage assembly and a trailing assembly, the carriage assembly being configured to translate the brush assembly along a first track and the trailing assembly being configured to follow, along a second track, parallel to the first track, the carriage assembly, wherein the trailing assembly is pulled, behind the carriage assembly, by the carriage assembly; and the carriage assembly having a pivot configured to pivot the rotational axis in a plane parallel to the first track and the rotational axis, wherein the carriage assembly moves ahead of the trailing assembly while both the carriage assembly and the trailing assembly move along the first and second tracks, respectively.

14. The cleaning apparatus of claim 13, wherein the trailing assembly comprises a pivot that is slidably attached to the brush assembly.

15. The cleaning apparatus of claim 13, wherein the pivot of the carriage assembly is configured to allow the brush assembly to pivot in the plane to an angle that is not perpendicular to the first and second tracks.

16. The cleaning apparatus of claim 13, wherein the carriage assembly comprises a drive motor, and wherein the brush assembly comprises a brush motor configured to rotate the at least one rotatable brush about the rotational axis.

17. The cleaning apparatus of claim 13, wherein the at least one rotatable brush comprises a sweeping member having a bristle pattern parallel to the rotational axis, or wherein each of the at least one rotatable brush comprises a shaft extending along the rotational axis and a sweeping member coupled to the shaft and configured to be rotatable about the rotational axis;

wherein the pivot of the carriage assembly is configured to rotate the shaft clockwise and counter-clockwise parallel to a solar panel; and wherein the rotational axis is not perpendicular to the direction of the first track while the cleaning apparatus is in an operational configuration.

18. The cleaning apparatus of claim 13, wherein the rotational axis is perpendicular to the first and second tracks when the carriage assembly and the trailing assembly are at rest and the rotational axis makes an angle smaller than 90° when the carriage assembly and the trailing assembly move along the first and second tracks, respectively.

19. The cleaning apparatus of claim 13, wherein the carriage assembly pulls the trailing assembly so that both the carriage assembly and the trailing assembly move along the first and second tracks, respectively.

20. The cleaning apparatus of claim 13, wherein the carriage assembly comprises:

a drive wheel that is driven by a motor; and rollers that run along the first track, wherein the rollers and the drive wheel are configured to have a triangular shape.

21. The cleaning apparatus of claim 20, wherein the first track has a triangular cross section and wherein each of the drive wheel and the rollers contacts a corresponding face of the first track.

* * * * *